(12) United States Patent
Richardson

(10) Patent No.: US 7,503,319 B2
(45) Date of Patent: Mar. 17, 2009

(54) POSITIVE CRANKCASE VENTILATION SYSTEM T FITTING

(76) Inventor: James Richardson, 26156 Balboa Crt., P.O. Box 1242, Helendale, CA (US) 92321

( * ) Notice: Subject to any disclaimer, the term of this patent is extended or adjusted under 35 U.S.C. 154(b) by 21 days.

(21) Appl. No.: 11/876,145

(22) Filed: Oct. 22, 2007

(65) Prior Publication Data

US 2008/0035128 A1  Feb. 14, 2008

Related U.S. Application Data

(63) Continuation-in-part of application No. 11/781,826, filed on Jul. 23, 2007, which is a continuation-in-part of application No. 11/330,466, filed on Jan. 12, 2006, now Pat. No. 7,249,598.

(51) Int. Cl.
*F02B 43/08* (2006.01)
(52) U.S. Cl. .................................................. 123/572
(58) Field of Classification Search ......... 123/572–574, 123/41.86
See application file for complete search history.

(56) References Cited

U.S. PATENT DOCUMENTS

| | | | | | |
|---|---|---|---|---|---|
| 3,181,833 | A | * | 5/1965 | Adams et al. | 251/121 |
| 3,913,541 | A | * | 10/1975 | Scott, Jr. | 123/572 |
| 3,967,605 | A | * | 7/1976 | Dolfi, Sr. | 123/574 |
| 3,973,534 | A | * | 8/1976 | Amos | 123/574 |
| 4,374,512 | A | * | 2/1983 | Starun | 123/556 |
| 7,249,598 | B1 | * | 7/2007 | Richardson | 123/572 |

* cited by examiner

*Primary Examiner*—M. McMahon
(74) *Attorney, Agent, or Firm*—Kenneth L. Green; Edgar W. Averill, Jr.

(57) ABSTRACT

An improved T fitting results in a more uniform flow of fumes from an engine crankcase. The T fitting combines flows from an air filter and a hose connected to the engine crankcase, into coaxial paths, and then combines the flows into a combined flow. The combined flow is drawn into an intake manifold by manifold vacuum. The combining of the flows through the coaxial paths results in a more uniform flow of fumes from the crankcase.

14 Claims, 7 Drawing Sheets

POSITIVE CRANKCASE VENTILATION SYSTEM T FITTING

The present application is a Continuation in Part of U.S. patent application Ser. No. 11/781,826 filed Jul. 23, 2007, which is a Continuation in Part of U.S. patent application Ser. No. 11/330,466 filed Jan. 12, 2006, which applications are incorporated in their entirely herein by reference.

BACKGROUND OF THE INVENTION

The present invention relates to reducing emissions from internal combustion engines and in particular to an improved T fitting for a Positive Crankcase Ventilation (PCV) system to facilitate a flow of crankcase fumes from the crankcase and into an engine air intake.

Diesel engines are commonly used in commercial applications such as trucks and stationary engines. These engines typically have much higher compression ratios than gasoline engines, and as a result, a substantial amount of diesel blow-by escapes past the piston rings. Unlike gasoline engines which use a simple crankcase ventilation system, the diesel blow-by is generally vented to the outside, and presents a source of unpleasant fumes. Diesel engines typically can not simply vent the crankcase to the engine intake, because of the presence of the diesel blow-by includes components which are likely to degrade diesel engine performance.

U.S. patent application Ser. No. 11/330,466 for "HYDROGEN AUGMENTED DIESEL CRANKCASE VENTILATION," a parent of the present application, discloses a system combining hydrogen and crankcase fumes in the intake of a diesel engine, whereby the hydrogen facilitates burning the crankcase fumes to reduce emissions and to improve mileage. The system of the '466 application includes a filter in the hose carrying the crankcase fumes to the engine intake. The filter both filters the fumes and traps liquids in the fumes. In some cases, the trapped liquids have filled the filter and prevented optimal operation of the system. Further, many diesel engines draw air from the intake manifold which is pumped into a tank and used to actuate, for example, air brakes. Drawing hydrogen into such a system may result in undesirable conditions.

U.S. patent application Ser. No. 11/781,826 for "HYDROGEN AUGMENTED DIESEL CRANKCASE VENTILATION," a parent of the present application, discloses a system with a filter with a drain hose for returning the trapped liquids to the crankcase. The filter drain hose has provided a good solution to the accumulation of liquid in the filter, but some systems have shown a somewhat irregular flow of fumes from the crankcase.

BRIEF SUMMARY OF THE INVENTION

The present invention addresses the above and other needs by providing an improved T fitting which results in a more uniform flow of fumes from an engine crankcase. The T fitting combines flows from an air filter and a hose connected to the engine crankcase, into coaxial paths, and then combines the flows into a combined flow. The combined flow is drawn into an intake manifold by manifold vacuum. The combining of the flows through the coaxial paths results in a more uniform flow of fumes from the crankcase.

In accordance with one aspect of the invention, there is provided a diesel engine having Positive Crankcase Ventilation (PCV) system. The diesel engine includes an engine block, a crankcase inside the engine block, at least one head attached to the engine block, an air intake carrying air to the at least one head, and an air filter filtering the air entering the air intake. The PCV system includes a T fitting, a fumes hose, a fresh air hose, and a combined flow hose. The T fitting includes a housing, a first inlet to the housing, a second inlet to the housing, an outlet from the housing, a first path inside the housing and connected to the first inlet to receive a first flow from the first inlet, and a second path inside the housing parallel to the first path and connected to the second inlet to receive a second flow from the second inlet, the second path ending at a combining area where the first flow and the second flow combine to form a combined flow. The fumes hose is connected between the crankcase of the diesel engine and a first one of the first inlet and the second inlet. The fresh air hose is connected between a second air filter and a second one of the first inlet and the second inlet, and the combined flow hose is connected between the outlet of the T fitting and the air intake of the diesel engine. The diesel engine may include an exhaust system with a particulate filter to reduce emissions.

In accordance with another aspect of the invention, there is provided a diesel engine having Positive Crankcase Ventilation (PCV) system. The diesel engine includes an engine block, a crankcase inside the engine block, at least one head attached to the engine block, an air intake carrying air to the at least one head, a turbo supercharger in cooperation with the air intake for pressurizing air entering the at least one head, and an air filter filtering the air entering the air intake. The PCV system includes a T fitting, a fumes hose, a fresh air hose, and a combined flow hose. The T fitting includes a housing, a first inlet to the housing, a second inlet to the housing, an outlet from the housing, a first path inside the housing connected to the first inlet to receive a first flow from the first inlet, a second path inside the housing parallel to the first path and connected to the second inlet to receive a second flow from the second inlet, the second path ending at a combining area where the first flow and the second flow combine to form a combined flow. The fumes hose is connected between the crankcase of the diesel engine and a first one of the first inlet and the second inlet and the fresh air hose is connected between a second air filter and a second one of the first inlet and the second inlet. The combined flow hose is connected between the outlet of the T fitting and the air intake of the diesel engine, and a fumes filter resides serially in the combined air hose to filter the combined flow and to trap liquids in the combined flow.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
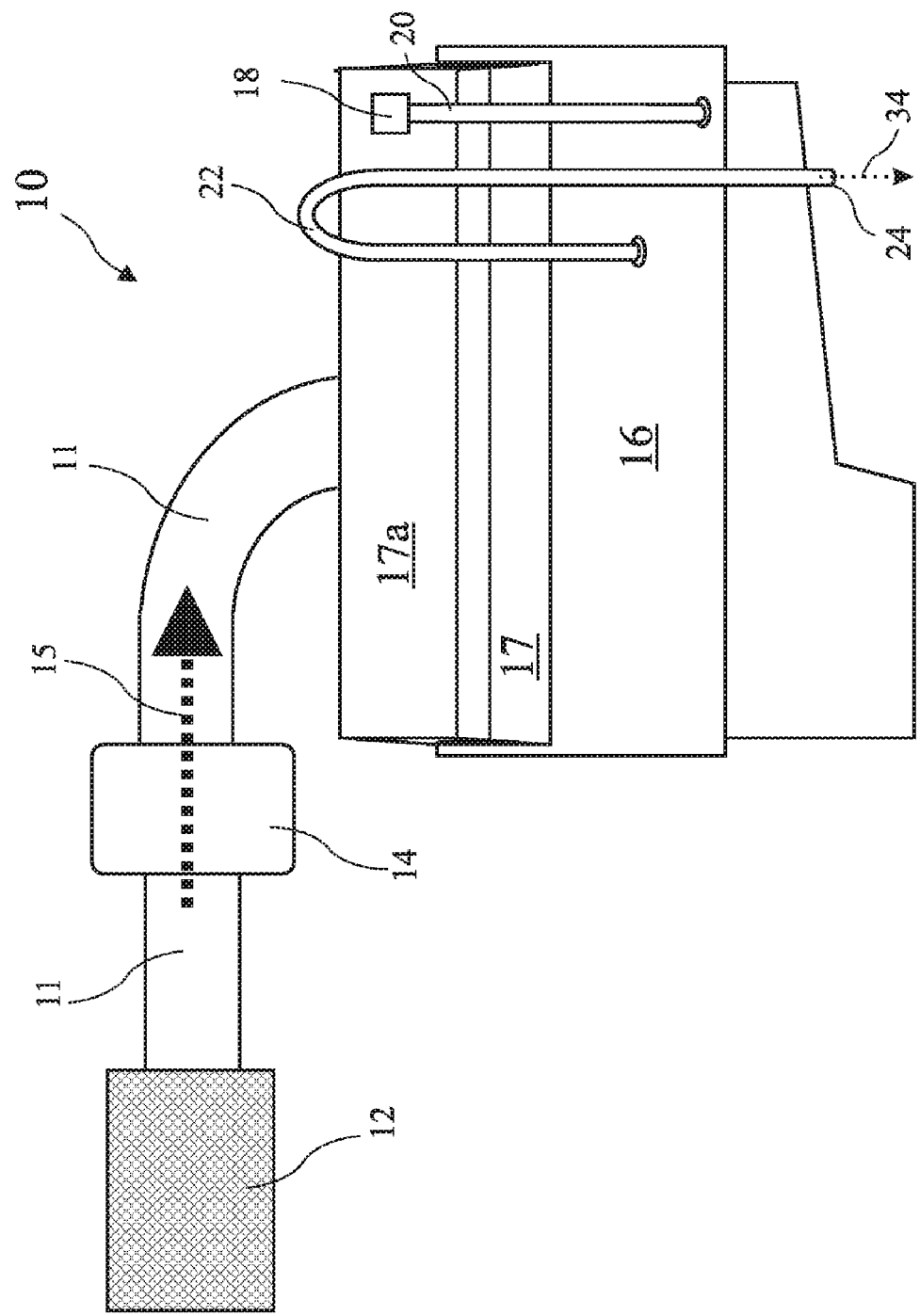
FIG. 1 is a prior art diesel engine.

A typical known diesel cycle engine 10 is shown in FIG. 1. Diesel cycle engines generally use common diesel fuel, but may use other fuels, for example, bio diesel fuel, or the like. The diesel engine 10 includes an engine block 16 which encloses a crankcase (not shown). At least one cylinder head 17 is attached to the block 16 and includes intake and exhaust ports for carrying air and fuel into the engine and exhaust out of the engine and valves to open and close the ports. Each head 17 is covered by a valve cover 17a. An air flow 15 used in the combustion process enters the diesel cycle engine 10 through an air filter 12, passing through an air intake 11 into the engine 10 through the at least one head 17. A supercharger 14 may reside in series in the air intake 11 to pressurize the air flow 15 entering the engine through the at least one head 17.

The diesel cycle engine 10 further includes an oil fill cap 18 on an oil fill tube 20 for adding motor oil to the diesel cycle engine 10. The diesel cycle engine 10 also generally includes a crankcase breather 22 with an open end 24 for venting the crankcase and allowing crankcase fumes 34, including diesel blow-by and the like (e.g., fumes generated by the breakdown of engine oil), to escape the crankcase through an open end 24 of the breather tube 22.

Figure 2A:
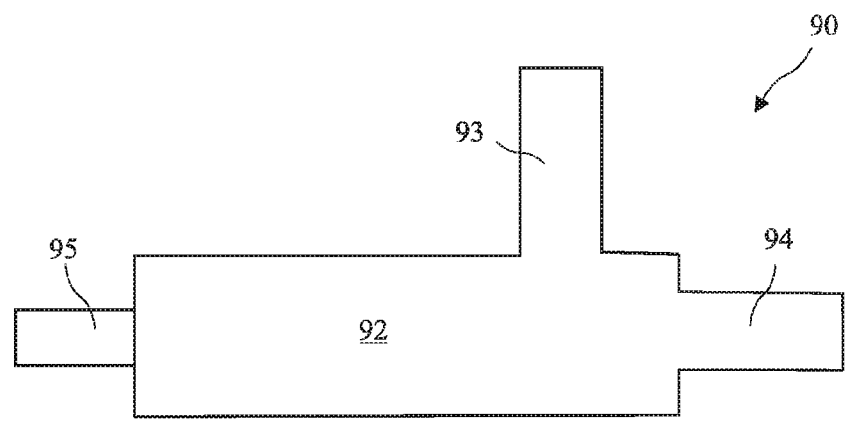
FIG. 2A is a side view of a T fitting according to the present invention.
Figure 2B:
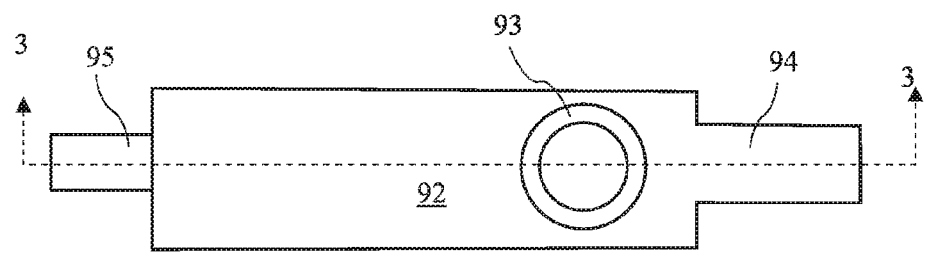
FIG. 2B is a top view of the T fitting according to the present invention.
Figure 3:
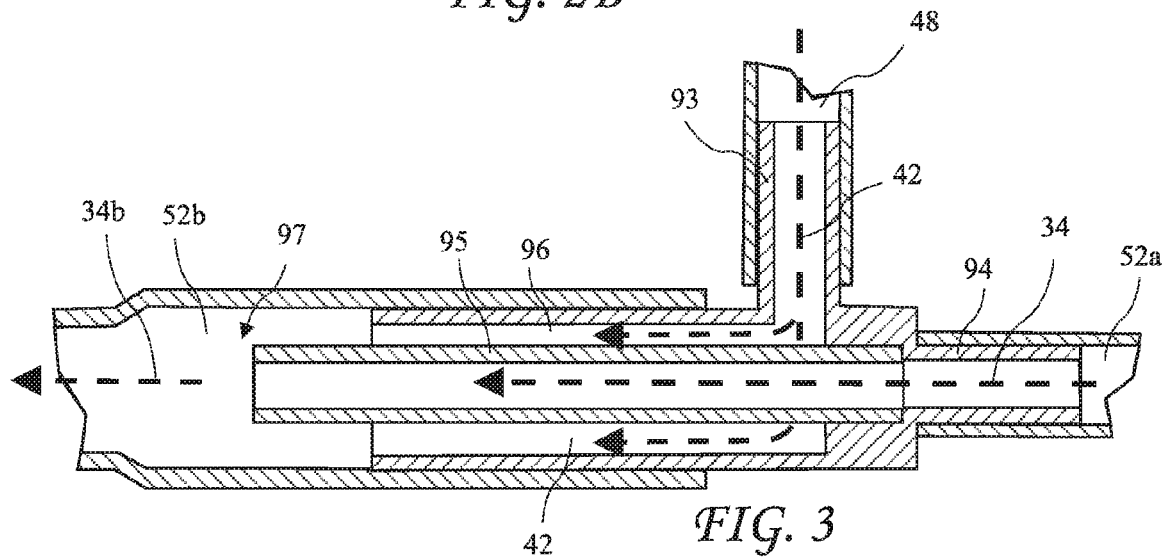
FIG. 3 is a cross-sectional view of the T fitting taken along line 3-3 of FIG. 2B.

A side view of a T fitting 90 according to the present invention is shown in FIG. 2A, a top view of the T fitting 90 is shown in FIG. 2B, and a cross-sectional view of the T fitting 90 taken along line 3-3 of FIG. 2B is shown in FIG. 3. The T fitting 90 has a housing 92 with a first inlet 93 and a second inlet 94 extending from the housing 92. A first flow enters the housing 92 through the inlet 93. An inner tube 95 resides inside the housing 92 and receives a second flow from the inlet 94. The path of the second flow is approximately parallel with the path of the first flow through the housing 92. The inner tube 95 ends and the flows combine in a combining area 97 to create a combined flow 34b. In one embodiment, the first flow is a fresh air flow 42 (see FIG. 4) and the second flow is the crankcase fumes flow 34. In another embodiment, the first flow is the crankcase fumes flow 34 and the second flow is the fresh air flow 42. A clean air hose 48 is shown connected to the inlet 93 and a crankcase fumes hose 52a is shown connected to the inlet 94.

A combined flow hose 52b is shown connected to the housing 92. The combined flow hose 52b connects to the air intake 11 (see FIG. 4) and vacuum in the air intake 11 draws a flow through the combined flow hose 52b. The structure of the housing 92 and inner tube 95 is provided to create the generally parallel flows 34 and 42 inside the T fitting 90 so that when the flows 34 and 42 merge at the combining area 97 a steady flow is created contributing to smooth engine operation.

One embodiment of the T fitting 90 is shown in FIGS. 2A, 2B, and 3, but the present invention may be embodied in many other structures of T fittings. For example, the inner tube may be hard or may be a flexible hose, and may end in the housing 92, or extend from the housing 92 into the combined flow hose 52b. Further, the fresh air flow 42 may enter the second inlet 94 and the crankcase fumes flow 34 may enter the first inlet 93 (see FIG. 7). A PCV system including any structure constraining the fresh air flow 42 and the crankcase fumes flow 34 to be generally parallel flows before being combined, is intended to come within the scope of the present invention. Within the context of the present invention, generally parallel means that the flows are constrained to paths which are approximately parallel within constraints of materials and manufacturing methods.

Figure 4:
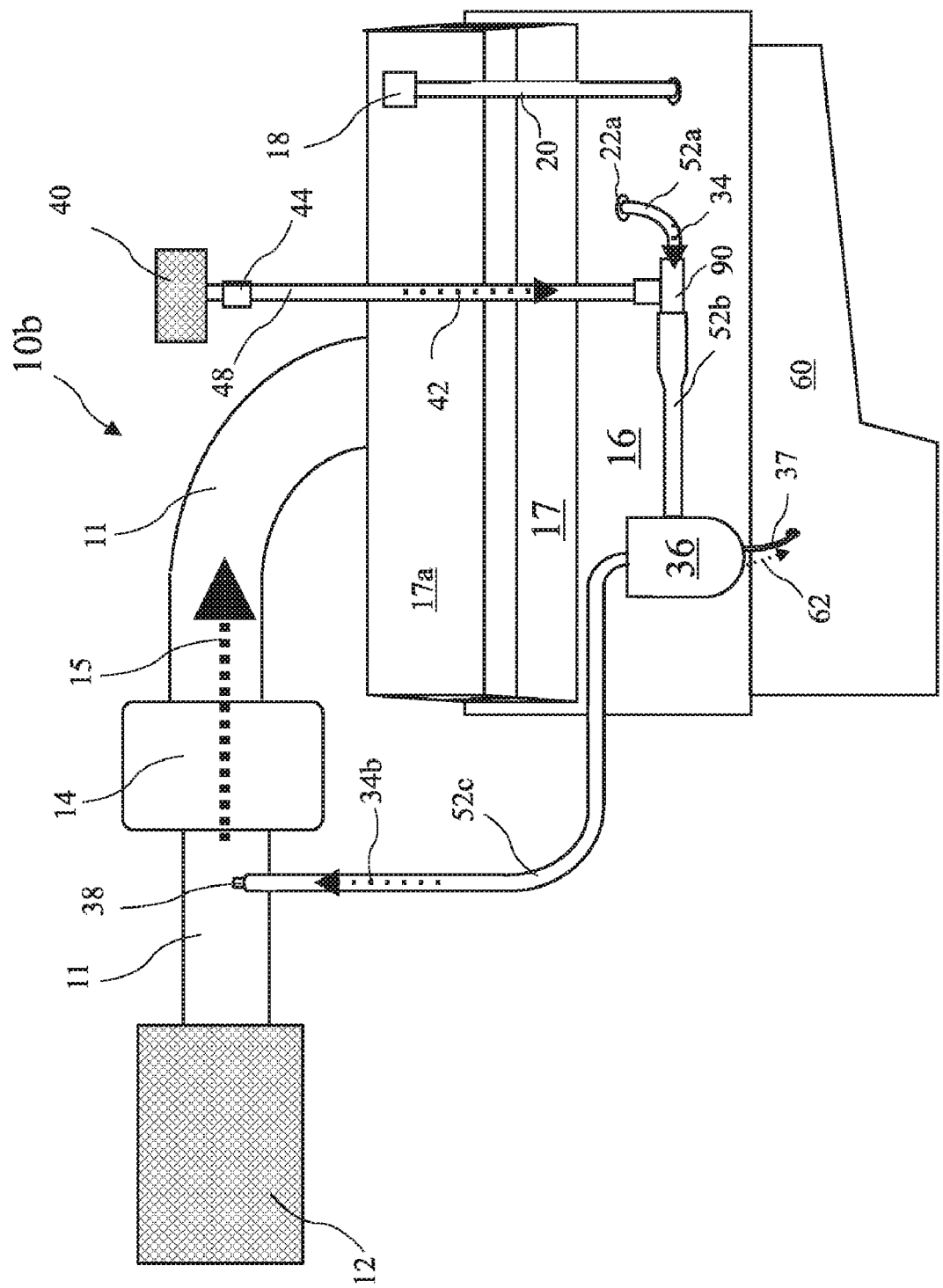
FIG. 4 is an engine including a Positive Crankcase Ventilation (PCV) system including the T fitting according to the present invention with crankcase fumes drawn from a breath tube opening in an engine block.

An engine 10b including a Positive Crankcase Ventilation (PCV) system including the T fitting 90 according to the present invention, is shown in FIG. 4. The crankcase fumes 34 are drawn from a breath tube opening 22a in an engine block 16 through the crankcase fumes hose 52a. The fresh air flow 42 is drawn through a second air filter 40 and a fresh air hose 48 into the T fitting 90. A back flow preventor 44 may reside in series in the fresh air hose 48 to prevent blow-by or other fumes, liquids, or solids from escaping the diesel cycle engine 10b through the air filter 40. The back flow preventor 44 may further include a vacuum regulator to regulate the crankcase vacuum. The crankcase vacuum is preferably regulated to be between approximately one and approximately four pounds. A combined flow hose 52b is connected between the T fitting 90 and a fumes filter 36 and a filtered flow hose 52c is connected between the filter 36 and air intake 11. The filtered flow hose 52c is connected to the air intake 11 before a supercharger when a supercharger is present so that vacuum is present in the filtered flow hose 52c. The filter 36 may include a drain hose 37 to allow liquid trapped in the filter to return to an oil pan 60 attached to the block 16. The system of FIG. 4, may, for example, be used on an engine without a hydrogen generator and with a particulate filter in the exhaust system.

Examples of suitable hydrogen generators are well known and described in US Patent Application Publication No. 2005/0258049 for "Hydrogen Generator For Use in a Vehicle Fuel System," U.S. Pat. No. 4,573,435 for "Method and Apparatus for Generating Hydrogen Gas for Use As a Fuel Additive on a Diesel Engine," U.S. Pat. No. 6,155,212 for "Method and Apparatus for Operation of Combustion Engines," and U.S. Pat. No. 6,901,889 for "Fumigation System for a Diesel Engine". The '049 application and the '435, '212, and '889 patents are herein incorporated by reference. An example of a suitable hydrogen generator is a Hydrogen Fuel Injection™ (HFI) system built by Canadian Hydrogen Energy Company Ltd, in Ontario, Canada.

A restriction 38 may be provided to restrict the flow 34b, which restriction 38 preferably cooperates with the hose 52c, and more preferably resides proximal to the connection point of the hose 52c to the air intake 11. The restriction 38 regulates (or limits) the flow 34b into the air intake 11. The restriction 38 may be manually adjustable or may be self adjusting, for example, a vacuum regulator, or may, for example, be a fixed size replaceable orifice, a variable orifice, or a clamp to squeeze the outside of the hose 52c to restrict the flow 34b. The restriction 38 may be used to adjust crankcase vacuum and preferably results in between approximately one pound and approximately four pounds of crankcase vacuum, and more preferably results in approximately two pounds of crankcase vacuum. In general, a larger engine will operate with a higher crankcase vacuum, and a small engine will operate with a lower crankcase vacuum. The restriction 38 may also cooperate with a vacuum regulator 44 in the clean air hose 48 to regulate crankcase vacuum.

Figure 5:
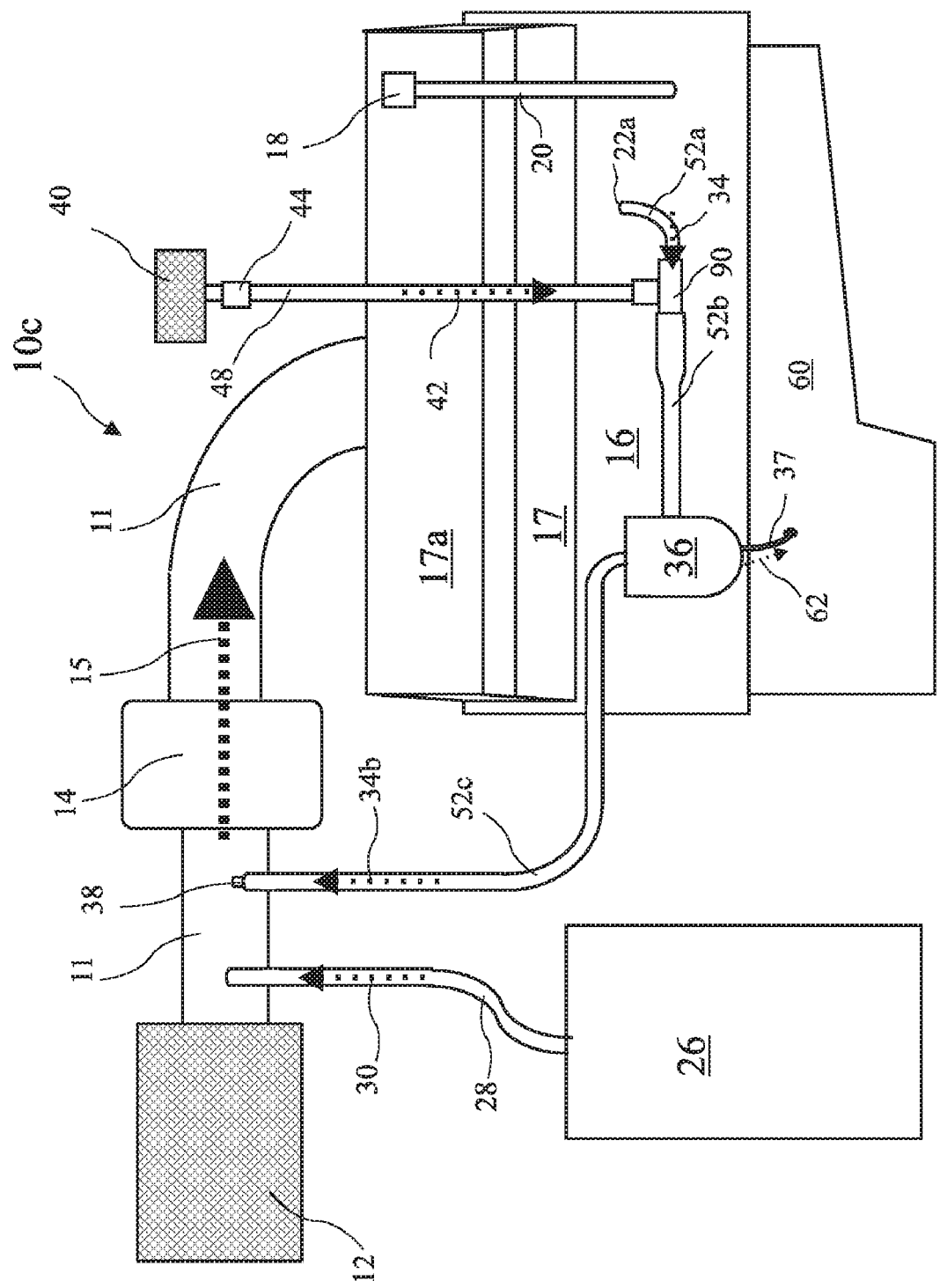
FIG. 5 is a second embodiment of an engine including a combination of the PCV system and T fitting according to the present invention and a hydrogen source to promote burning of crankcase fumes, the combination according to the present invention.

A second embodiment of an engine 10c including a combination of the PCV system with the T fitting 90 and a hydrogen source 26, to promote burning of crankcase fumes 34, is shown in FIG. 5. The hydrogen source 26 is connected to the air intake between the air filter 12 and turbo supercharger 14 by a hydrogen hose 28 to introduce a hydrogen flow 30 into the air flow 15. The engine 10c is otherwise like the engine 10b shown in FIG. 4. Oxygen from the hydrogen source 26 may also be provided to the air intake 11 through an oxygen hose.

Figure 6:
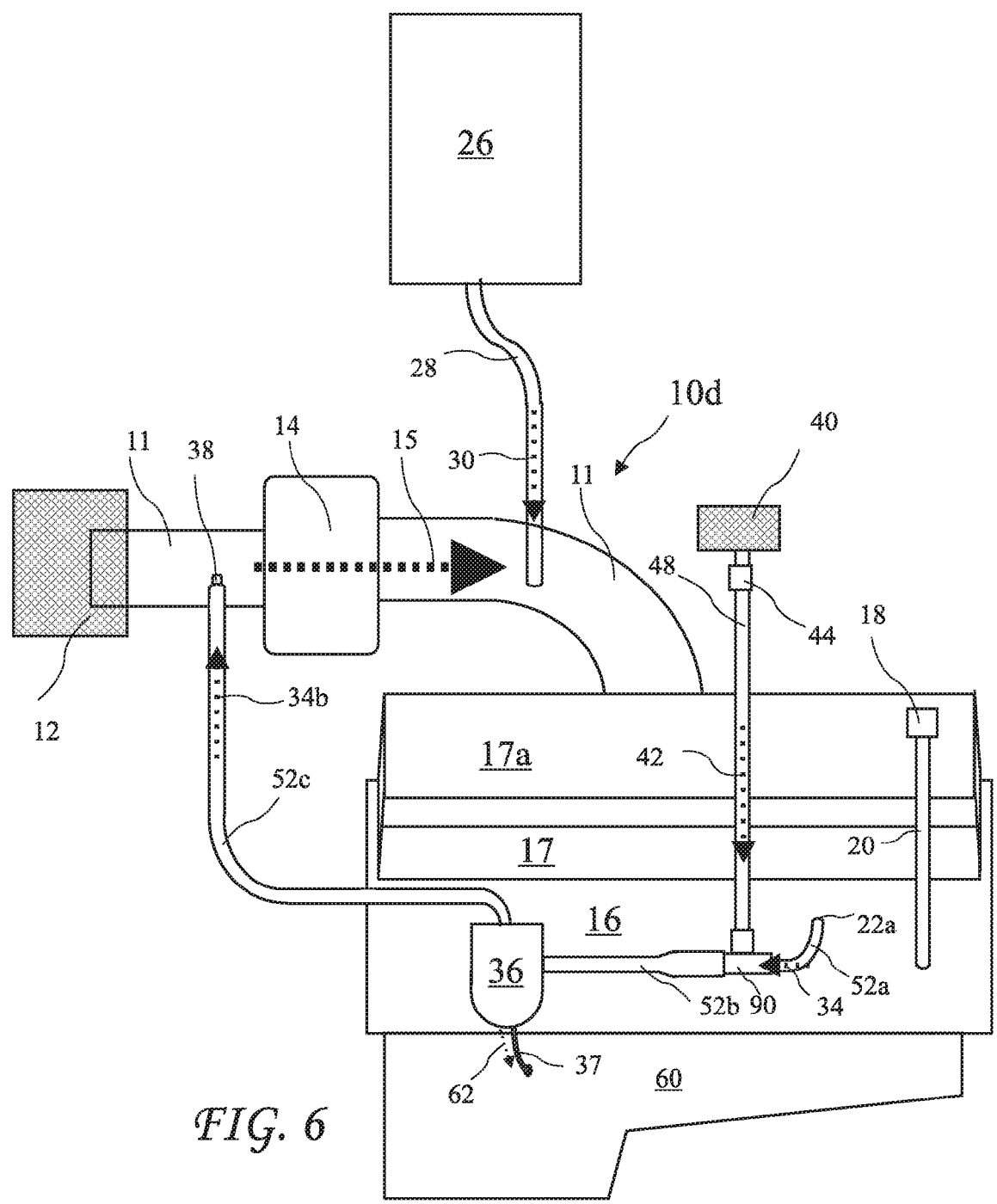
FIG. 6 a third embodiment of an engine including a combination of the PCV system and T fitting according to the present invention and the hydrogen source to promote burning of crankcase fumes, the combination according to the present invention, with hydrogen introduced to an air intake after a turbo supercharger.

A third embodiment of an engine 10d including the combination of the PCV system and T fitting 90 and the hydrogen source 26 to promote burning of crankcase fumes 34, is shown in FIG. 6. In the instance of the engine 10d, the hydrogen flow 30 is introduced to the air flow 15 after a turbo supercharger 14. The engine 10d is otherwise like the engine 10b shown in FIG. 4.

Figure 7:
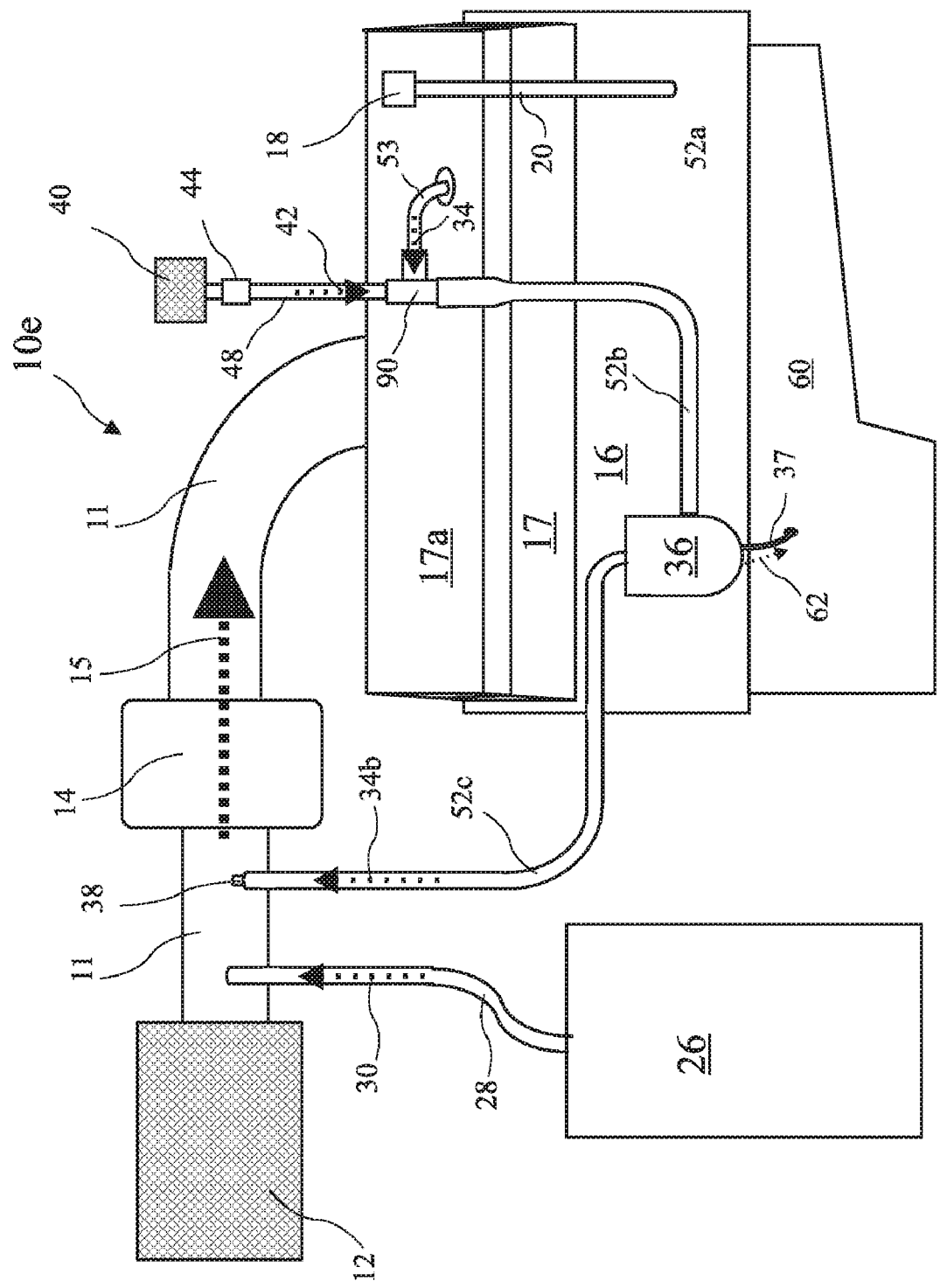
FIG. 7 a fourth embodiment of an engine including a combination of the PCV system and T fitting according to the present invention and the hydrogen source to promote burning of crankcase fumes, the combination according to the present invention with crankcase fumes drawn through a valve cover

A fourth embodiment of an engine 10e including the PCV system and T fitting 90 is shown in FIG. 7 with crankcase fumes 34 drawn through the valve cover 17a. In the instance of the engine 103, the crankcase fumes 34 enter the first inlet 93 of the T fitting 90 and the fresh air flow 42 enters the T fitting through the second inlet 94 and it is understood that the first and second inlets of the T fitting may be used for either the crankcase fumes flow or for the fresh air flow interchangeably in any embodiment of the present invention and the particular use is a matter of convenience in connecting hoses. Further, the crankcase fumes flow 34 may be drawn from the engine block, valve covers, valley cover, or any location on the engine providing access to the crankcase. The engine 10e is otherwise like the engine 10b shown in FIG. 4. The engine 10b may further include the hydrogen source 26 (see FIG. 5) to promote burning of crankcase fumes 34, and oxygen from the hydrogen source 26 may further be provided to the air intake 11 through an oxygen hose.

Figure 8:
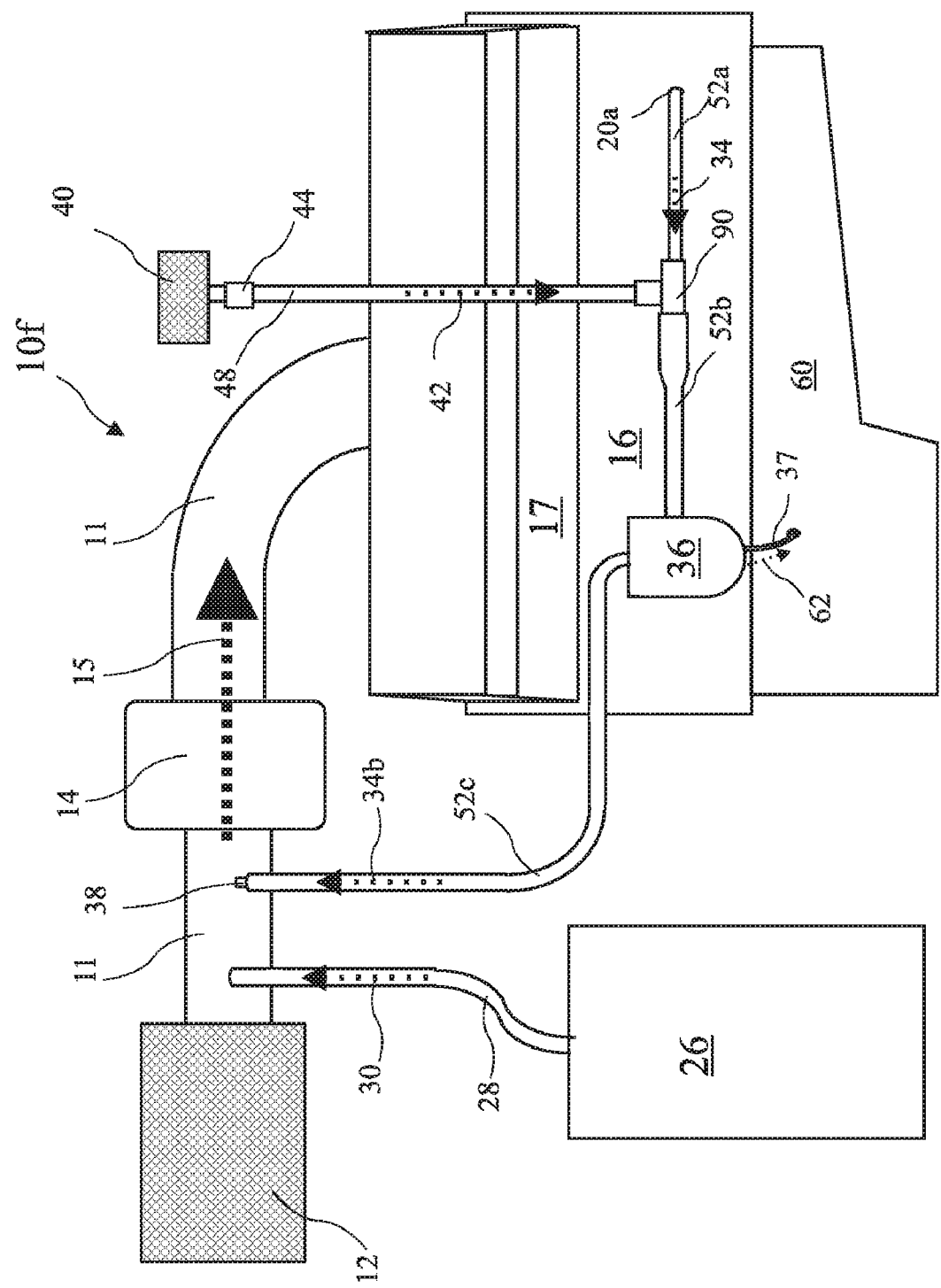
FIG. 8 is a fifth embodiment of an engine including a combination of the PCV system and T fitting according to the present invention and the hydrogen source to promote burning of crankcase fumes, the combination according to the present invention with crankcase fumes drawn from an oil fill tube opening in the engine block.

A fifth embodiment of an engine 10f including a combination of the PCV system and T fitting 90 and the hydrogen source to promote burning of crankcase fumes is shown in FIG. 8 with crankcase fumes 34 drawn from an oil fill tube opening 20a in the engine block 16. The engine 10f is otherwise like the engine 10b shown in FIG. 4.

Regarding the hoses referenced above, metal or plastic tubing may be used as well, or any suitable conduit, may be used to carry the flows.

While the invention herein disclosed has been described by means of specific embodiments and applications thereof, numerous modifications and variations could be made thereto by those skilled in the art without departing from the scope of the invention set forth in the claims.

I claim:

1. A Positive Crankcase Ventilation (PCV) system comprising:
   a T fitting having:
      a housing;
      a first inlet to the housing;
      a second inlet to the housing;
      an outlet from the housing;
      a first path inside the housing and connected to the first inlet to receive a first flow from the first inlet;
      a second path inside the housing generally parallel to the first path and connected to the second inlet to receive a second flow from the second inlet, the second path ending at a combining area where the first flow and the second flow combine to form a combined flow;
   a fumes hose connected between a crankcase of an engine and a first one of the first inlet and the second inlet for carrying a fumes flow to the T fitting;
   a fresh air hose connected between a fresh air source and a second one of the first inlet and the second inlet for carrying a fresh air flow to the T fitting; and
   a combined flow hose connected between the outlet and an air intake of the engine.

2. The PCV system of claim 1, further including a fumes filter in the combined flow hose residing between the T and the air intake for filtering the combined flow.

3. The PCV system of claim 1, wherein the second path comprises a hard inner tube inside and coaxial with the housing.

4. The PCV system of claim 3, wherein the inner tube ends inside the housing.

5. The PCV system of claim 3, wherein the inner tube comprises a flexible hose.

6. The PCV system of claim 4, wherein the inner tube comprises a flexible hose extending into the combined flow hose.

7. The PCV system of claim 1, wherein the engine is a diesel engine and the PCV system further includes a hydrogen source connected to the intake intake by a hydrogen hose for providing a hydrogen flow to the air intake.

8. The PCV system of claim 7, wherein the diesel engine is a supercharged diesel engine and both the hydrogen hose and the combined flow hose connect to the air intake between an air filter and the supercharger.

9. The PCV system of claim 8, wherein the supercharged diesel engine is a turbo supercharged diesel engine.

10. The PCV system of claim 9, wherein combined flow hose connects to the air intake between the air filter and the turbo supercharger and the hydrogen hose connects to the air intake after the turbo supercharger.

11. The PCV system of claim 1, wherein the crankcase is closed other than the fumes flow through the fumes hose.

12. A diesel engine having a Positive Crankcase Ventilation (PCV) system comprising:
   the diesel engine having:
      an engine block;
      a crankcase inside the engine block;
      at least one head attached to the engine block;
      an air intake carrying air to the at least one head; and
      an air filter filtering the air entering the air intake;
   the PCV system comprising:
      a T fitting comprising:
         a housing;
         a first inlet to the housing;
         a second inlet to the housing;
         an outlet from the housing;

a first path inside the housing and connected to the first inlet to receive a first flow from the first inlet;

a second path inside the housing parallel to the first path and connected to the second inlet to receive a second flow from the second inlet, the second path ending at a combining area where the first flow and the second flow combine to form a combined flow;

a fumes hose connected between the crankcase of the diesel engine and a first one of the first inlet and the second inlet;

a fresh air hose connected between a second air filter and a second one of the first inlet and the second inlet; and a combined flow hose connected between the outlet of the T fitting and the air intake of the diesel engine.

13. The PCV system of claim 12, wherein the diesel engine includes an exhaust system having a particulate filter.

14. A diesel engine having a Positive Crankcase Ventilation (PCV) system comprising:

the diesel engine having:
an engine block;
a crankcase inside the engine block;
at least one head attached to the engine block;
an air intake carrying air to the at least one head;
a turbo supercharger in cooperation with the air intake for pressurizing air entering the at least one head; and
an air filter filtering the air entering the air intake;

the PCV system comprising:
a T fitting comprising:
a housing;
a first inlet to the housing;
a second inlet to the housing;
an outlet from the housing;
a first path inside the housing and connected to the first inlet to receive a first flow from the first inlet;
a second path inside the housing parallel to the first path and connected to the second inlet to receive a second flow from the second inlet, the second path ending at a combining area where the first flow and the second flow combine to form a combined flow;

a fumes hose connected between the crankcase of the diesel engine and a first one of the first inlet and the second inlet;

a fresh air hose connected between a second air filter and a second one of the first inlet and the second inlet;

a combined flow hose connected between the outlet of the T fitting and the air intake of the diesel engine; and a fumes filter residing serially in the combined flow hose to filter the combined flow and to trap liquids in the combined flow.

\* \* \* \* \*